Nov. 12, 1968          P. A. FIVEL          3,410,218
MOTOR PUMP UNIT
Filed June 8, 1967          3 Sheets-Sheet 3
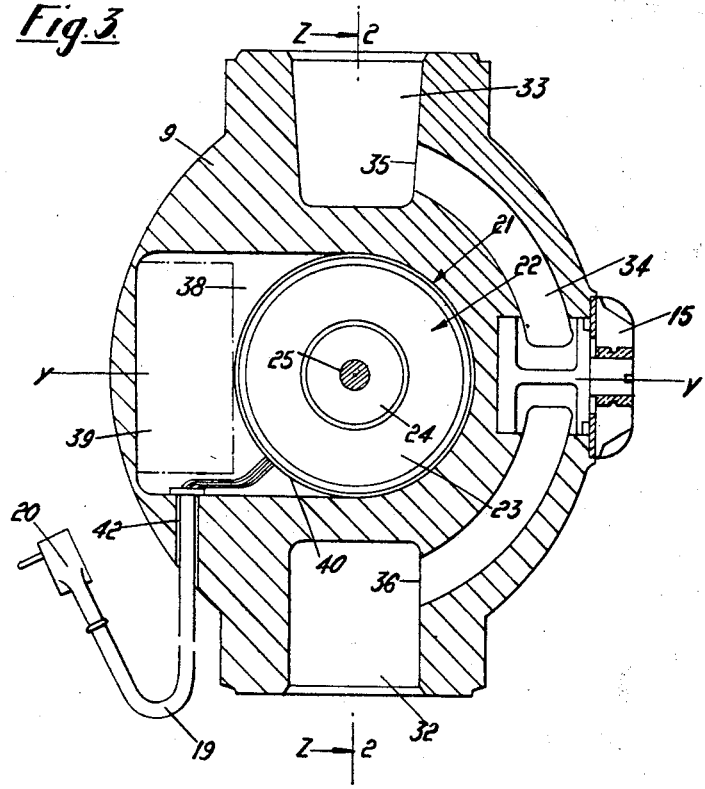
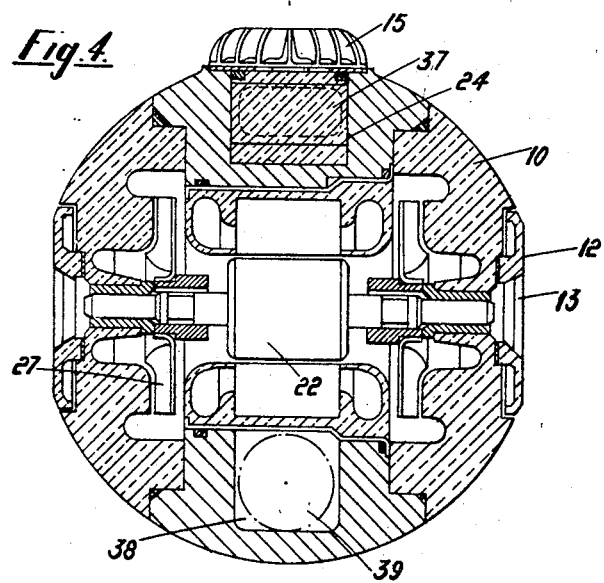

# United States Patent Office 3,410,218
Patented Nov. 12, 1968

3,410,218
MOTOR PUMP UNIT
Pierre Albert Fivel, Argenteuil, France, assignor to International Standard Electric Corporation
Filed June 8, 1967, Ser. No. 644,570
Claims priority, application France, June 20, 1966, 66,103
5 Claims. (Cl. 103—87)

ABSTRACT OF THE DISCLOSURE

A sphere-shaped closely coupled booster pump having motor and dual pump sections amenable to immersion in the fluid. The common rotational axis of the motor and pumps is normal to the inlet and outlet piping.

---

This invention concerns electric-motor pump units and, more particularly closely coupled electric motor driven rotary pump units designed for insertion in piping carrying fluids to activate the circulation. Units of this type are used, for example, in central heating installations and commonly referred to as booster pumps.

In a well known layout, the pump is located between two in-line pipes, with a perpendicular rotational axis. The motor, which is coupled to the pump on this rotational axis, is shifted relative to the axis of the piping. The motor, arranged in this manner, is somewhat cumbersome because, among other things, special thrust bearing arrangements are required. Nonetheless vibrations are generated with this arrangement.

In another well known layout, the rotational axis of the pump and the motor is aligned with the piping. In this layout, the ends of the motor shaft are not accessible, so that it is not possible, either to free or degum the rotating assembly after a period of stoppage, or check the rotational direction.

It is an object of the present invention to provide convenient layout which does not have the aforementioned disadvantages and which offers certain other advantages.

According to a feature of the invention, the rotary pump-electric motor unit to be inserted in a length of piping includes, in a casing with the general shape of a ball or sphere: (1) a suction pipe and a ram port, aligned on a main axis of the ball, (2) an electric motor placed at the center of the said casing with its rotational axis perpendicular to the said main axis, (3) two symmetrical rotary pumps aligned with the said rotational axis, on both ends of the motor and coupled to the said piping in a first meridian plane of the sphere (which contains the main axis and the rotational axis) and, (4) devices associated with the pump and the motor and accommodated in a perpendicular meridian plane. These associated devices include such things as: (a) adjustable return duct between the ram and the suction piping, which runs round the motor on one side in the said perpendicular plane, and (b) a quadrature condenser housed on the other side of the motor. A quadrature condenser is usually associated with an asynchronous motor connected to a single one phase line.

In accordance with another feature of the invention, the layout includes: (1) a unit casing, preferably made out of metal, which contains the two aligned ports to be coupled to the piping; (2) a single central transverse cylindrical cavity designed to receive the motor, with two open faces, and (3) side cavities on the sides of the cylindrical cavity to receive accessory devices; and (4) two shells, preferably made out of plastic material, which complete the said casing on the open faces of the cylindrical cavity and which contain the working chambers of the two pumps are are coupled to the said suction and ram piping. These two shells can be equipped, in a manner known per se, with removable ports making it possible to observe and gain access to the ends of the motor shaft.

In accordance with another feature of the invention, one of the said side cavities runs round the cylindrical cavity between the ram and suction piping to form a return channel, and an adjustment cock is inserted in this channel with its accessible key placed substantially on a third geometric axis of the unit.

In accordance with another feature of the invention, the other side cavity forms a recess designed to receive the quadrature condenser and which opens into the cylindrical cavity. Both of the cavities are isolated from the water circuit by a sealed motor mounting in the cylindrical cavity on both sides of the said recess.

Other features and advantages of the invention will be shown in the description of the practical example which will be made hereafter with references to the attached drawings, in which:

FIGURE 3 is another axial section along the plane ZY of FIGURE 1 and along arrows 3—3 on FIGURE 2;

FIGURE 4 is a transverse section along plane XY of FIGURE 1 and along arrows 4—4 on FIGURE 2.

Figure 1:
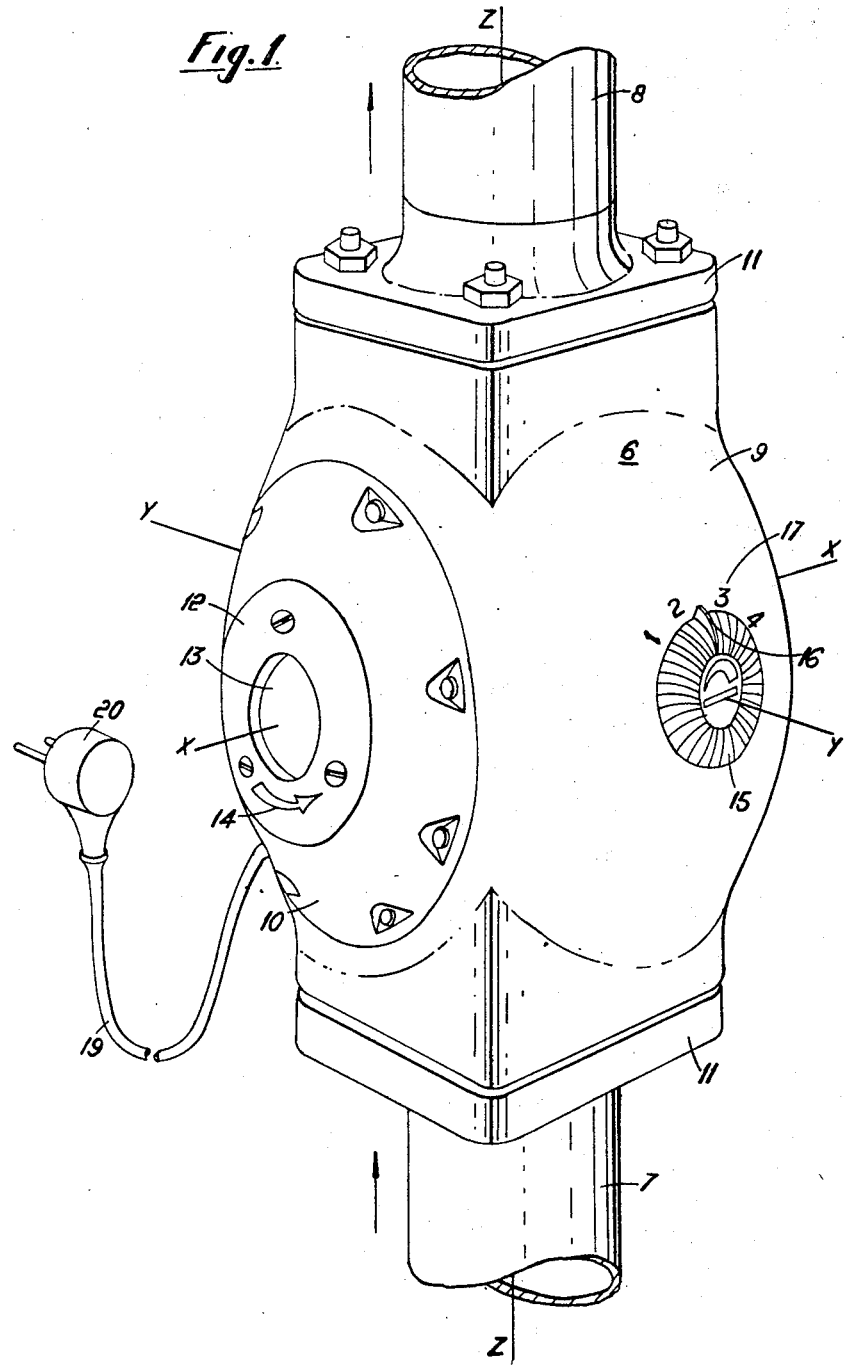
FIGURE 1 is an exterior perspective view of a booster pump unit according to the invention.

With reference to FIGURE 1, the unit 6 has the general shape of an oval ball or sphere which is inserted in piping between pipes 7, 8. The axis Z—Z which is the main axis of the ball is concentric with the axis of the piping. It is assumed that pipe 7 is on the suction side and pipe 8 the ram or pressure side of the piping. Perpendicular axis X—X is the rotational axis of the pump and Y—Y is the third geometric axis of the ball.

The body of the unit 6 comprises a metal part 9 which has the general shape of an O in plane ZY. The two open faces of this body are completed by round shells 10 made out of plastic material. Each shell, in turn, has a central opening closed by a removable glass 12. These glasses can each be made out of a plastic material part treated in such a manner as to be transparent in a central area 13. It is assumed that the pump will rotate in the direction shown by arrow 14.

In the perpendicular meridian plane, one one side of axis Y—Y a rotating button 15 is installed. The button is equipped with a pointer 16 which cooperates with a scale 17 engraved (or molded) into casing 9 (FIGURES 1, 2, 3, 4). This button adjusts the characteristic of the pump by any appropriate methods. In the example shown, this button is adapted to rotate the key of a cock inserted in a return duct, as will be later described.

On the other side of the body, in the same meridian plane, the electric cable 19 of the motor is located. The cable terminates in an electrical connector equipped with pins 20. It will be further seen that, in the layout as shown, where a quadrature condenser is housed in casing 6, the connection cable 19 has two wires and makes it possible to use an ordinary two-pole electrical connector.

The body 9 is coupled to piping 7, 8 by any appropriate means such as the square flanges 11 shown on the drawing or by means of threaded piping, etc.

Figure 2:
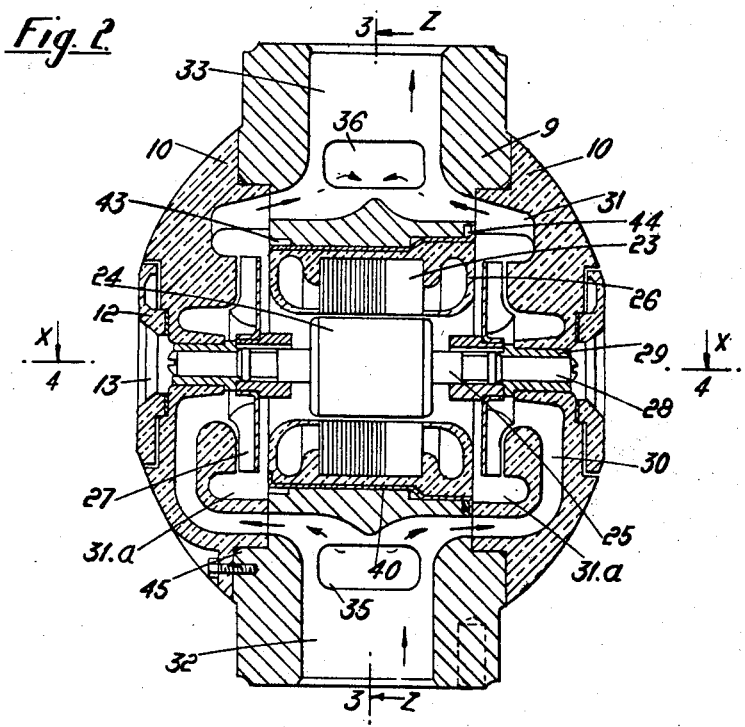
FIGURE 2 is an axial section along the plane XZ of FIGURE 1 and along arrows 2—2 on FIGURE 3.
Figure 5:
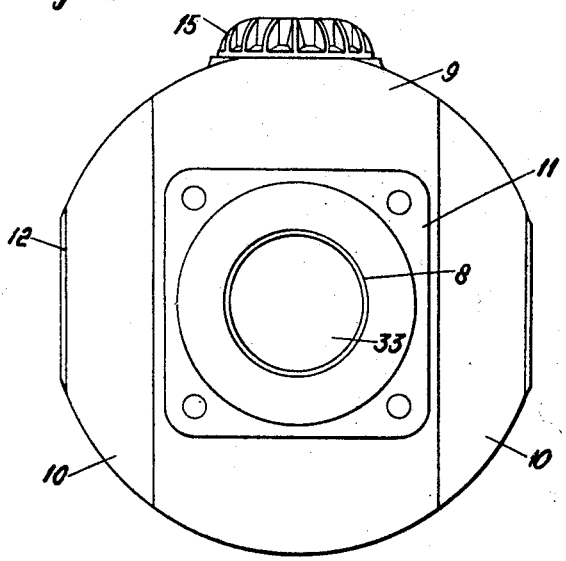
FIGURE 5 is a plane view along the same direction as on FIGURE 4.

A description will now be given of the interior of unit 6 with reference to FIGURES 2, 3 and 4. The general O shape of body 9 is shown on FIGURE 3. The central cavity 21 of this casing is cylindrical along rotational axis X—X (FIGURE 2) and round in the plane of FIGURE 3. It receives the electric motor 22, including a stator 23, a rotor 24 and a shaft 25. The shaft serves the two pump wheels or impellers. In the example shown, stator 23, FIGURE 2, is completely encased in an insulating material 26 molded in a sleeve 40. This stator is designed to remain immersed in water. Rotor 24 is also immersible. It is possible to use any other appropriate method of manufacture such as a dry stator insulated from the immersed rotor by an air gap sleeve, etc.

Two centrifugal pumps are mounted symmetrically in unit 6 on both ends of motor 22. Shaft 25 carries two impellers 27 and terminates after these wheels in shaft ends 28 which rotate in bearings 29 mounted in the shells 10. The working chambers of the pumps in which the impeller 27 rotate are cavities formed in the shells 10. These working chambers include, in each shell 10, a suction duct 30 and a pressure duct 31. Another suction duct 32 and a pressure duct 33 are formed in casing 9 along axis Z—Z. The two ducts 30 are coupled laterally to duct 32 and the two ducts 31 to duct 33.

In the plane Z–Y of FIGURE 1 and shown in section on FIGURE 3, body 9 contains two lateral cavities. To the right, this consists of a return duct 34 which, at 35, draws off from pressure duct 33 and which opens into suction duct 32 at 36. The orifices 35 and 36 are also visible on FIGURE 2. The return flow through this duct is adjusted by means of a dome cock 37, the rotational axis of which is on axis Y—Y. The knob 15 of this cock was described with reference to FIGURE 1.

To the left on FIGURE 3, there is an inner recess 38 which opens on central cavity 21. This recess 38 receives the quadrature condenser 39 of stator 23. The two-wire cable 19 enters into the recess 38 through a drilled hole 42. The two wires of cable 19 are connected in accordance with the conventional layout for this type of equipment that is one wire is connected to the input of the direct phase of the starter and also to the input of condenser 19. The output of the condensor is connected to the input of the other phase of the stator and the other wire is connected to the outputs of the two phases.

Recess 38 is isolated from the pumped fluid by means of circular gaskets 43 and 44 (FIGURE 2) which fill the joint between cylindrical cavity 21 and sleeves 14 at both ends. Two other circular gaskets 45 are crushed between shells 10 and casing 9 to assure the exterior tightness of the casing. Naturally, the ports 12 are also mounted in shells 10 in a tight manner.

It will be understood that the layout as described, with its two symmetrical pumps, balances the axial leads on shaft 25 and makes it possible to do away with axial abutment devices which are used in single pumps and which are subject to breakdowns. It must be further understood that a description, as given hereabove, represents solely a practical example of the invention and that this particular description does not limit the scope of the invention.

I claim:

1. A closely coupled electric motor driven booster pump combination amenable to operation while immersed in the pumped fluid, said combination comprising, a generally spherically shaped casing, an inlet port and an outlet port aligned on the main axis of the sphere, means for coupling said inlet and outlet ports to a suction pipe and a pressure pipe, respectively, electric motor means located in the center of the said casing with its rotational axis perpendictular to the said main axis, two symmetrical rotary pumps aligned on the said rotational axis at both ends of the motor, means in a first meridian plane of a sphere for coupling the said pumps to the said pipes, and booster pump drive and control means accommodated in a second meridian plane.

2. The booster pump combination of claim 1 wherein return duct means are provided extending in said second meridian plane on one side of said motor from said inlet port to said outlet port, and means for selectively adjusting the flow in said duct means.

3. The booster pump combination of claim 2 and wherein quadrature condenser means associated with said motor is located on the other side of said motor in said second meridian plane.

4. The booster pump combination of claim 3, wherein access means are provided in the casing of said pump combinaiton to enable access to the dual impellers and wherein said access means is transparent to enable observation of the impellers.

5. The booster pump combination of claim 1 wherein said second meridian plane is normal to said first meridian plane.

References Cited

UNITED STATES PATENTS 2,603,157    7/1952    Cohery _____ 103—5
2,814,254    11/1957    Litzenberg _____ 103—87

ROBERT M. WALKER, *Primary Examiner.*